(12) United States Patent
Yonezawa

(10) Patent No.: US 12,548,279 B2
(45) Date of Patent: Feb. 10, 2026

(54) IMAGE PROCESSING APPARATUS AND METHOD FOR GENERATING CUT-OUT IMAGES IN MOVING IMAGES

(71) Applicant: CANON KABUSHIKI KAISHA, Tokyo (JP)

(72) Inventor: Keiko Yonezawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 388 days.

(21) Appl. No.: 18/160,098

(22) Filed: Jan. 26, 2023

(65) Prior Publication Data

US 2023/0274522 A1 Aug. 31, 2023

(30) Foreign Application Priority Data

Jan. 28, 2022 (JP) .................................. 2022-012430

(51) Int. Cl.
*G06V 10/25* (2022.01)
*G06T 7/20* (2017.01)
*G06T 7/70* (2017.01)
*G06V 10/44* (2022.01)

(52) U.S. Cl.
CPC ................ *G06V 10/25* (2022.01); *G06T 7/20* (2013.01); *G06T 7/70* (2017.01); *G06V 10/44* (2022.01); *G06T 2207/20104* (2013.01); *G06T 2207/20132* (2013.01); *G06V 2201/07* (2022.01)

(58) Field of Classification Search
CPC .... G06V 10/25; G06V 10/44; G06V 2201/07; G06V 20/42; G06V 10/40; G06T 7/20; G06T 7/70; G06T 2207/20104; G06T 2207/20132; G06T 2207/10016; G06T 2207/20101; G06T 2207/30228; G06T 2207/30244; G06T 7/246; G06T 7/73; G06T 7/187; G06T 2207/30241; G06T 7/11; H04N 21/44008; H04N 23/661; H04N 23/695; G06F 3/0484
See application file for complete search history.

(56) References Cited

U.S. PATENT DOCUMENTS

2017/0125064 A1* 5/2017 Aggarwal .............. H04N 5/222
2017/0132470 A1* 5/2017 Sasaki ..................... G06T 15/30

FOREIGN PATENT DOCUMENTS

JP      2005223487 A  *  8/2005
WO     2018181248 A1    10/2018

OTHER PUBLICATIONS

Carr, P., et al., "Hybrid Robotic/Virtual Pan-Tilt-Zoom Cameras for Autonomous Event Recording", Oct. 21, 2013.

* cited by examiner

*Primary Examiner* — Jennifer Mehmood
*Assistant Examiner* — Vaisali Rao Koppolu
(74) *Attorney, Agent, or Firm* — Canon U.S.A., Inc., IP Division

(57) ABSTRACT

An image processing apparatus acquires a moving image to be processed, detects an object from each of images included in the moving image, determines a position of a region of interest in each of the images included in the moving image, based on a result of the detection, derives a cutting locus for the moving image based on a locus corresponding to movement of the position of the region of interest and a reference position for a cutting-out region, the cutting locus being a locus corresponding to movement of a position of the cutting-out region, and generates a cut-out image from the cutting-out region identified based on the cutting locus in each of the images included in the moving image.

11 Claims, 8 Drawing Sheets

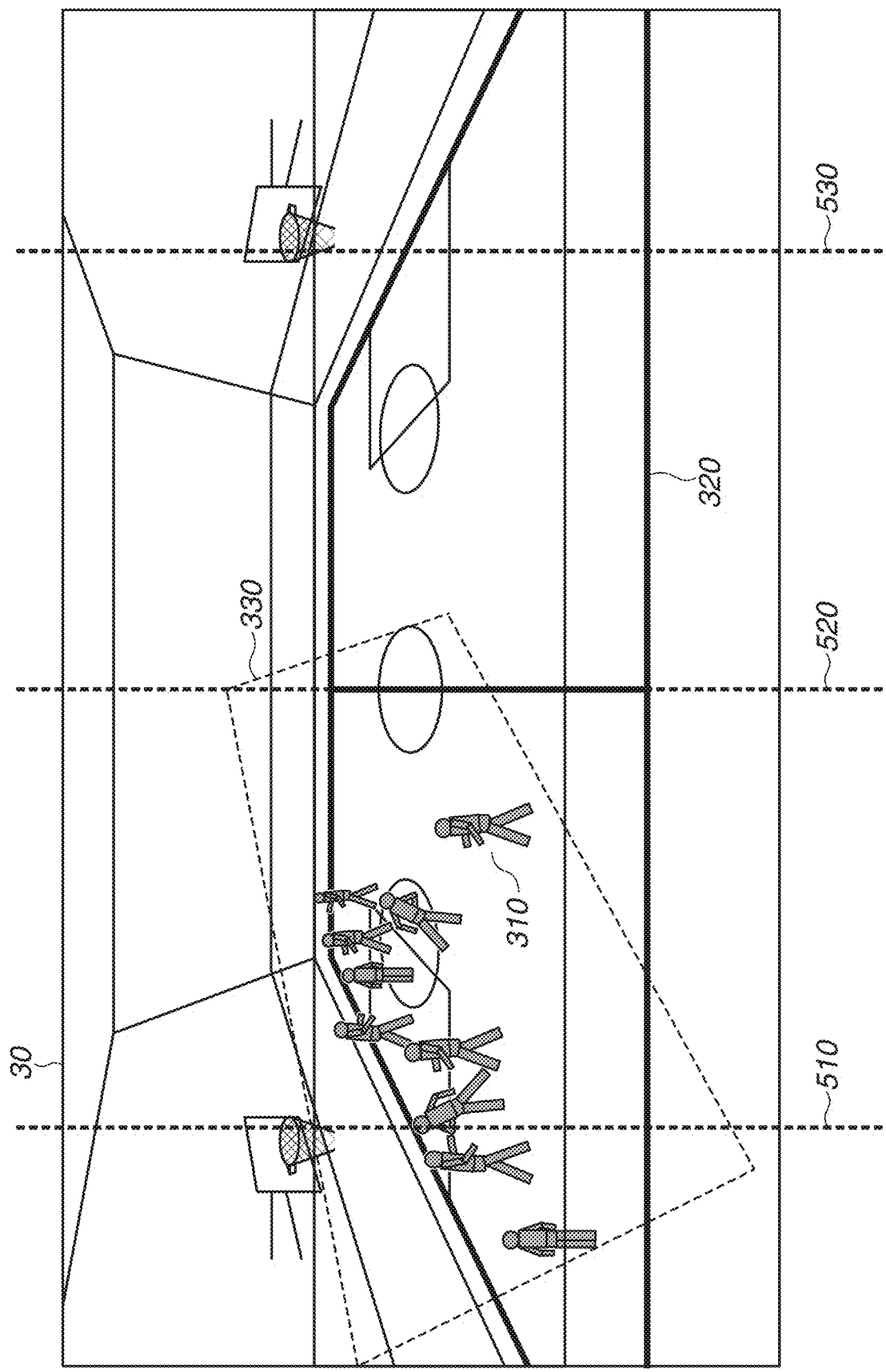

IMAGE PROCESSING APPARATUS AND METHOD FOR GENERATING CUT-OUT IMAGES IN MOVING IMAGES

BACKGROUND

Field

The present disclosure relates to an image processing technique.

Description of the Related Art

There is a technique for generating a cut-out image by cutting out a cutting-out region, which is a partial region to be cut out from an image, from the image. By gradually changing the position (or size) of the cutting-out region in the image, the imaging range of an image capturing apparatus can be changed virtually. Such processing for changing the position (or size) of the cutting-out region is referred to as digital panning/tilting/zooming (digital PTZ). Further, there is a technique for generating a cut-out image by determining a cutting-out region in an image based on positional information about one or a plurality of objects (e.g., persons) detected from the image and cutting out the determined cutting-out region from the image in the digital PTZ. With this technique, the positional change of the one or plurality of objects may cause a slight change in the position of the cutting-out region in each image included in a moving image. As a result of this, a moving image (a cut-out moving image) formed by the series of cut-out images may be difficult to view for a user and make the user feel strange. To address the issue, Japanese Patent Application Laid-Open No. 2005-223487 discusses a technique of moving the position of a cutting-out region along a regression line obtained by linear regression analysis based on the position of a person in an image.

With the technique discussed in Japanese Patent Application Laid-Open No. 2005-223487, however, since the position of the cutting-out region depends solely on the position of the person in the image, a region not originally intended by the user in the image may also be determined as the cutting-out region, depending on the behavior of the person in the image.

SUMMARY

The present disclosure is directed to a technique capable of more appropriately determining cutting-out regions in a plurality of images included in a moving image in a case where cut-out images are generated from the cutting-out regions.

According to an aspect of the present disclosure, an image processing apparatus includes a computer executing instructions which, when executed by the computer, cause the image processing apparatus to: acquire a moving image to be processed; detect an object from each of a plurality of images included in the moving image; determine a position of a region of interest in each of the plurality of images included in the moving image, based on a result of the detection; derive a cutting locus for the moving image based on a locus corresponding to movement of the position of the region of interest and a reference position for a cutting-out region, the cutting locus being a locus corresponding to movement of a position of the cutting-out region; and generate a cut-out image from the cutting-out region identified based on the cutting locus in each of the plurality of images included in the moving image.

Further features of the present disclosure will become apparent from the following description of exemplary embodiments with reference to the attached drawings.

BRIEF DESCRIPTION OF THE DRAWINGS

FIG. 5 is a diagram illustrating a reference position.

DESCRIPTION OF THE EMBODIMENTS

Figure 1:
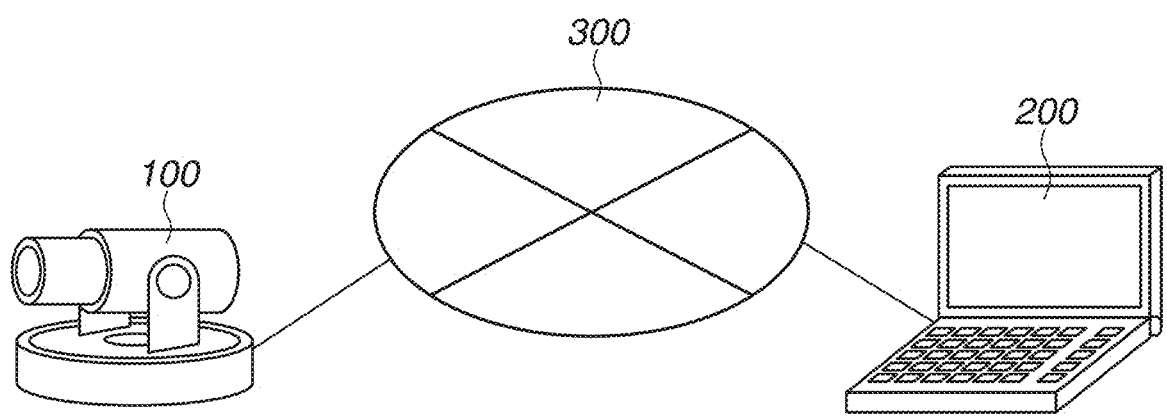
FIG. 1 is a diagram illustrating an example of a system configuration.

Exemplary embodiments of the present disclosure will be described in detail below with reference to the attached drawings. The below-described exemplary embodiments are not intended to limit the scope of the claimed disclosure. While a plurality of features in the exemplary embodiments is described below, not all the features are essential to the disclosure, and the features can be combined in any way. Further, components that are the same or similar are given the same reference numerals in the attached drawings, and redundant descriptions thereof will be omitted.

While the capturing of images of sports scenes is described as an example in the following exemplary embodiments, the exemplary embodiments are not limited thereto and are also applicable to the capturing of images of various scenes of events, concerts, and lectures. Further, in the following exemplary embodiments, an image processing apparatus that functions as an image capturing apparatus (a network camera) capable of connecting to a network and communicating with another apparatus will be described. The exemplary embodiments, however, are not limited thereto and are also applicable to an image processing apparatus that functions as an image capturing apparatus incapable of connecting to a network. Further, while an image processing apparatus is described to have an image capturing function in the following exemplary embodiments, the exemplary embodiments are not limited thereto, and any apparatus other than an image processing apparatus can implement an image capturing function and the image processing apparatus can acquire captured images from the other apparatus. Further, the images acquired in this manner can be images generated by combining captured images from a plurality of images capturing apparatuses, for example, using stitching processing.

An image processing apparatus according to a first exemplary embodiment acquires a moving image obtained by capturing images of sports scenes, and generates a cut-out image from a cutting-out region in each of the images included in the moving image by using a result of detecting players and a ball in the moving image. In the present exemplary embodiment, basketball scenes will be described as an example of a use case. Generally, in a basketball game, a scene where players gather at a right or left part of a court and attack while passing a ball and a scene where the offense and defense switch and players move across the court are repeated. Even in such a case, the present exemplary embodiment can achieve the movement of the position of the cutting-out region corresponding to the development of the game to follow the players and the ball without delay when the offense and defense switch, while suppressing slight variations in the position of the cutting-out region due to the influence of slight movements of the players.

FIG. 1 schematically illustrates a configuration of a system according to the present exemplary embodiment. The system according to the present exemplary embodiment includes an image processing apparatus 100 and a client apparatus 200. The image processing apparatus 100 also functions as an image capturing apparatus. The image processing apparatus 100 and the client apparatus 200 are communicably connected to each other via a network 300. In the present exemplary embodiment, the image processing apparatus 100 is assumed to be an apparatus (e.g., a network camera) capable of connecting to a network and communicating with another apparatus. However, the capability of connecting to a network is not essential, and the image processing apparatus 100 and the client apparatus 200 can be connected to each other directly with a High-Definition Multimedia Interface (HDMI®) cable or a serial digital interface (SDI) cable. Further, a cut-out video image can be generated by acquiring a previously captured and stored image and then analyzing the acquired image.

The client apparatus 200 transmits a distribution request command for requesting distribution of a video stream (or an image stream) and a setting command for setting various parameters, to the image processing apparatus 100 based on user's operations. The image processing apparatus 100 distributes the video stream to the client apparatus 200 based on the distribution request command, and stores various parameters based on the setting command. A configuration of the image processing apparatus 100 will be described below. The client apparatus 200 can be implemented by installing a predetermined program onto a computer such as a personal computer, a tablet terminal, or a smartphone.

Figure 2A:
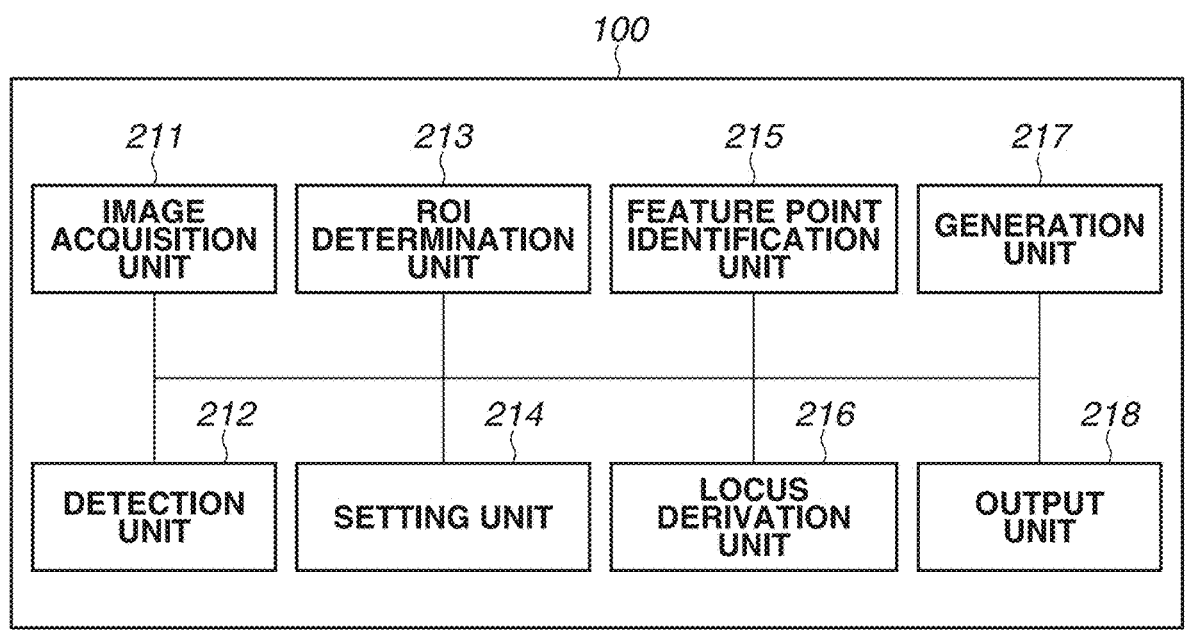
FIG. 2A is a diagram illustrating an example of functional blocks of an image processing apparatus.
Figure 2B:
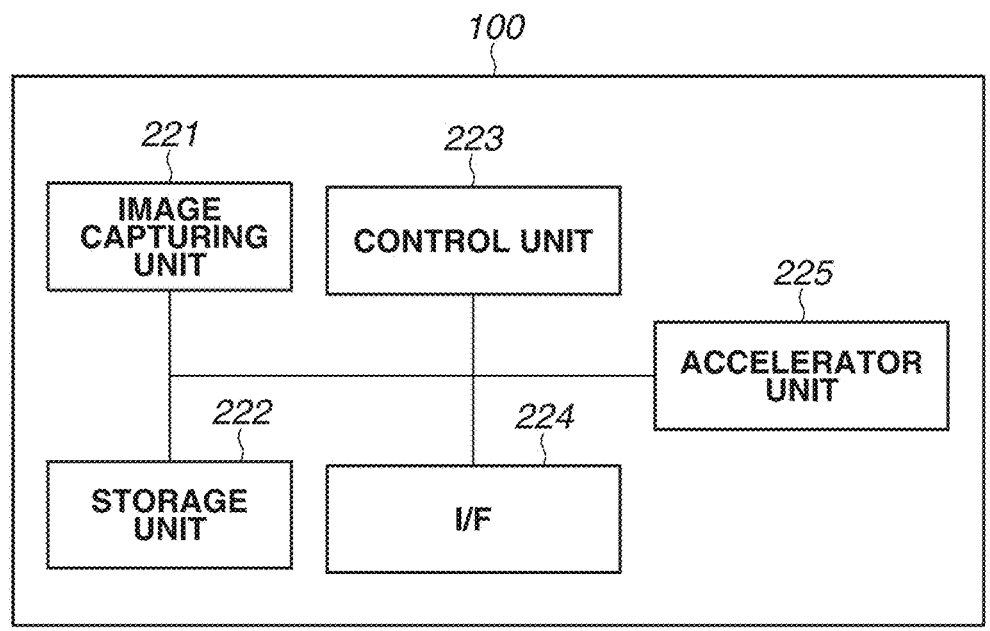
FIG. 2B is a diagram illustrating an example of a hardware configuration of the image processing apparatus.

Next, the image processing apparatus 100 will be described in further detail with reference to FIGS. 2A and 2B. FIG. 2A illustrates an example of functional blocks of the image processing apparatus 100. FIG. 2B illustrates an example of a hardware configuration of the image processing apparatus 100. Referring to FIG. 2A, the image processing apparatus 100 includes, as functional blocks, an image acquisition unit 211, a detection unit 212, a region-of-interest (ROI) determination unit 213, a setting unit 214, a feature point identification unit 215, a locus derivation unit 216, a generation unit 217, and an output unit 218. For example, the functional blocks illustrated in FIG. 2A are implemented by a central processing unit (CPU) of the image processing apparatus 100 (the image capturing apparatus) executing a computer program stored in a read-only memory (ROM) of the image processing apparatus 100, which will be described below with reference to FIG. 2B.

The image acquisition unit 211 acquires a moving image captured by an image capturing unit 221 (described below) or acquires a moving image from an external apparatus (not illustrated).

The detection unit 212 performs object detection processing on each of a plurality of images included in the moving image acquired by the image acquisition unit 211 to detect objects therefrom. Examples of the objects to be detected by the detection unit 212 according to the present exemplary embodiment are players and a ball in the images. For example, the detection unit 212 can use a method of generating a classifier in advance by learning the features of detection target objects using a machine learning method, and detecting the detection target objects from the images using the classifier. The detection unit 212 stores the images acquired by the image acquisition unit 211 and information about the objects detected from the images (position information and size information about the objects) in a storage unit 222.

The ROI determination unit 213 calculates a region of interest (ROI) in each of the images based on the position information about the objects detected by the detection unit 212. The ROI determination unit 213 acquires information about a center position of the ROI in each of the images and stores the acquired information in the storage unit 222.

The setting unit 214 sets a reference position for a cutting-out region. Details of the reference position setting will be described below. Information about the reference position set by the setting unit 214 is stored in the storage unit 222.

The feature point identification unit 215 extracts feature points based on the information about the center position of the ROI acquired by the ROI determination unit 213 and the information about the reference position acquired by the setting unit 214. The extracted feature points are stored in the storage unit 222.

The locus derivation unit 216 derives a locus (a cutting locus) indicating the movement of the position of the cutting-out region, based on the feature points acquired by the feature point identification unit 215. Information about the cutting locus derived by the locus derivation unit 216 is stored in the storage unit 222.

The generation unit 217 performs cut-out processing on each of the plurality of images included in the moving image stored in the storage unit 222, based on the cutting locus derived by the locus derivation unit 216, and generates a series of cut-out images. Further, the generation unit 217 generates a moving image (hereinafter referred to as a cut-out moving image) including the series of cut-out images generated through the cut-out processing on each of the images included in the moving image.

The output unit 218 outputs the cut-out moving image generated by the generation unit 217 to an external apparatus via an interface (I/F) 224 (described below).

Next, the example of the hardware configuration of the image processing apparatus 100 will be described with reference to FIG. 2B. As illustrated in FIG. 2B, the image processing apparatus 100 includes, as hardware components, the image capturing unit 221, the storage unit 222, a control unit 223, the I/F 224, and an accelerator unit 225.

The image capturing unit 221 uses an image sensor to receive light focused through a lens and convert the received light into charge to acquire a moving image. For example, a complementary metal oxide semiconductor (CMOS) image sensor can be used as the image sensor. Alternatively, a charge-coupled device (CCD) image sensor can be used as the image sensor. While a case where the image capturing unit 221 is included in the hardware configuration is described as an example in the present exemplary embodiment, the image capturing unit 221 is not an essential hardware component, and a previously captured and stored moving image can be acquired via the network 300.

The storage unit 222 includes both a ROM and a random-access memory (RAM) or includes one of a ROM and a RAM and stores programs for performing various operations and functions of the image processing apparatus 100. Further, the storage unit 222 can store data (such as commands and image data) and various parameters acquired from an external apparatus such as the client apparatus 200 via the I/F 224. For example, the storage unit 222 stores, for each of the images included in the moving image captured by the image capturing unit 221, information relating to camera settings in capturing the image, such as pan/tilt/zoom values, white balance information, and exposure information. The storage unit 222 can also store parameters relating to the captured moving image, including a frame rate of the moving image and a size (a resolution) of the moving image.

Further, the storage unit 222 can provide a work area to be used when the control unit 223 performs various types of processing. Furthermore, the storage unit 222 can function as a frame memory or a buffer memory. Besides a memory such as a ROM or a RAM, a storage medium such as a flexible disk, a hard disk, an optical disk, a magneto-optical disk, a compact disk (CD) ROM (CD-ROM), a CD recordable (CD-R), a magnetic tape, a non-volatile memory card, or a digital versatile disk (DVD) can be used as the storage unit 222.

The control unit 223 includes a CPU or a micro-processing unit (MPU) and controls the entire image processing apparatus 100 by executing programs stored in the storage unit 222.

Alternatively, the control unit 223 can control the entire image processing apparatus 100 by collaborating with programs stored in the storage unit 222 and an operating system (OS). The control unit 223 can include a processor such as a digital signal processor (DSP) or an application-specific integrated circuit (ASIC).

The I/F 224 transmits and receives wired or wireless signals to communicate with the client apparatus 200 via the network 300.

The accelerator unit 225 is a processing unit that includes a CPU, a graphics processing unit (GPU), a field-programmable gate array (FPGA), and a storage unit, and is added to a camera in order to mainly perform high-performance processing using deep learning.

Next, processing by the image processing apparatus 100 according to the present exemplary embodiment will be described with reference to FIGS. 3 and 4. While a case where the image processing apparatus 100 performs analysis processing such as the object detection processing is described in the present exemplary embodiment, the analysis processing can be performed by an accelerator unit added externally via a Universal Serial Bus (USB) or by a dedicated apparatus including a GPU or a FPGA.

Figure 3:
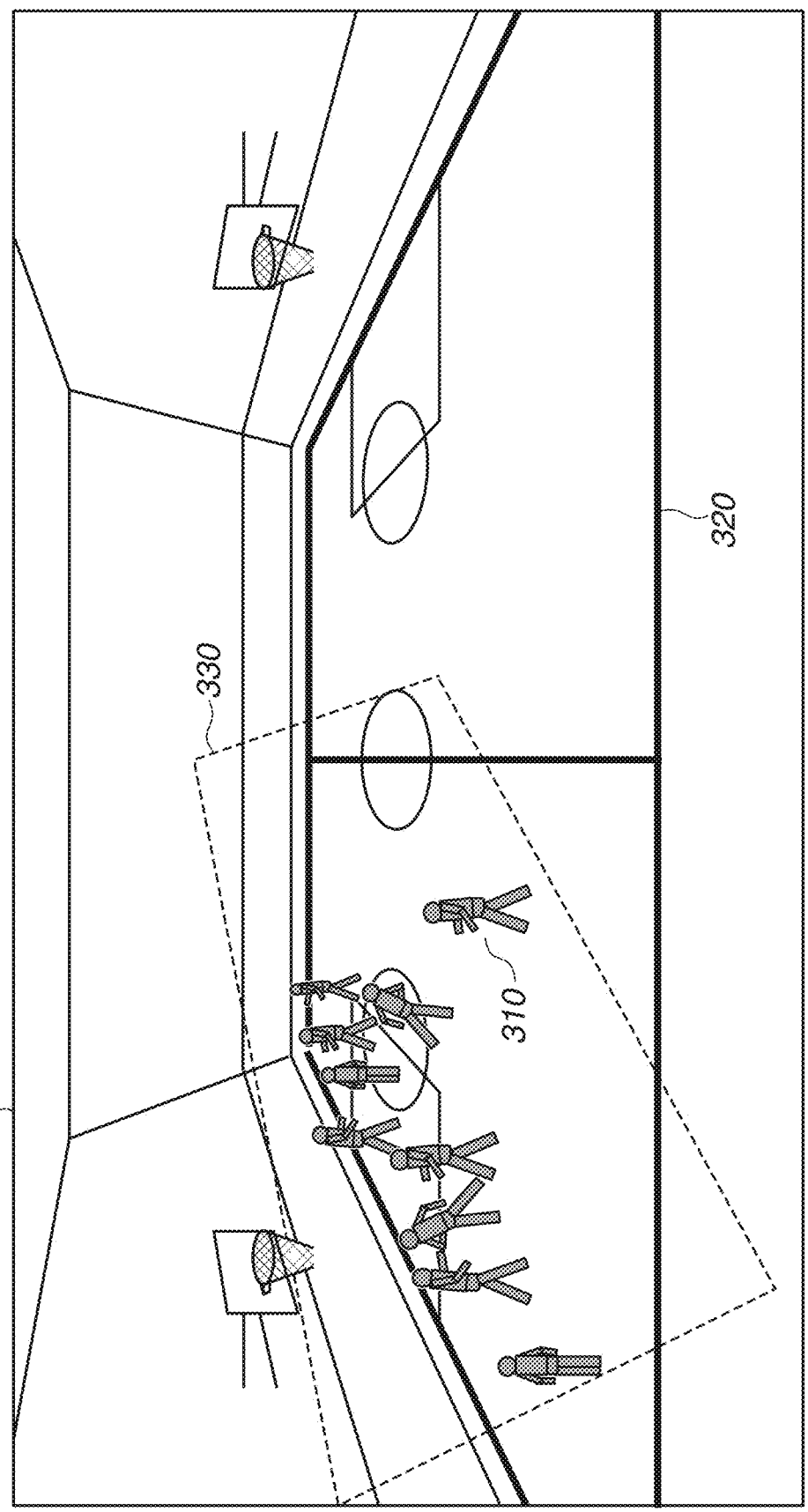
FIG. 3 is a diagram illustrating determination of a region of interest.

In the present exemplary embodiment, a use case where a sport competition is set as a target as illustrated in FIG. 3 is assumed. FIG. 3 illustrates an image 30 captured by the image processing apparatus 100 so that the image 30 includes a plurality of players 310 playing basketball and an entire basketball court 320. FIG. 3 further illustrates a cutting-out region 330 that is determined by processing to be described below based on a result of detecting the players 310 and a ball included in the image 30.

In a case where the object detection processing is performed on each image 30 included in a moving image to detect the players 310 and a ball therefrom and the cutting-out region 330 is determined based on the result of the object detection processing, the position of the cutting-out region 330 may change between the images 30 of temporally previous and subsequent frames. This may be not only a reflection of the change due to the players 310 moving as the game develops but also a reflection of the change due to an error, such as erroneous detection or omission of detection, or a reflection of the change due to a movement, such as a dribble or a pass, based on which a camera is not supposed to be moved. In order to reduce such fluctuations in the position of the cutting-out region to be cut out, the image processing apparatus 100 according to the present exemplary embodiment performs the following processing. The image processing apparatus 100 identifies feature points based on a locus corresponding to movement of the center position of the ROI determined for each image 30 included in the moving image. Then, a locus that smoothly connects the identified feature points is derived as a cutting locus, and the cutting-out region is moved along the cutting locus, whereby a smooth cut-out moving image is generated as a video image to be displayed.

Figure 4:
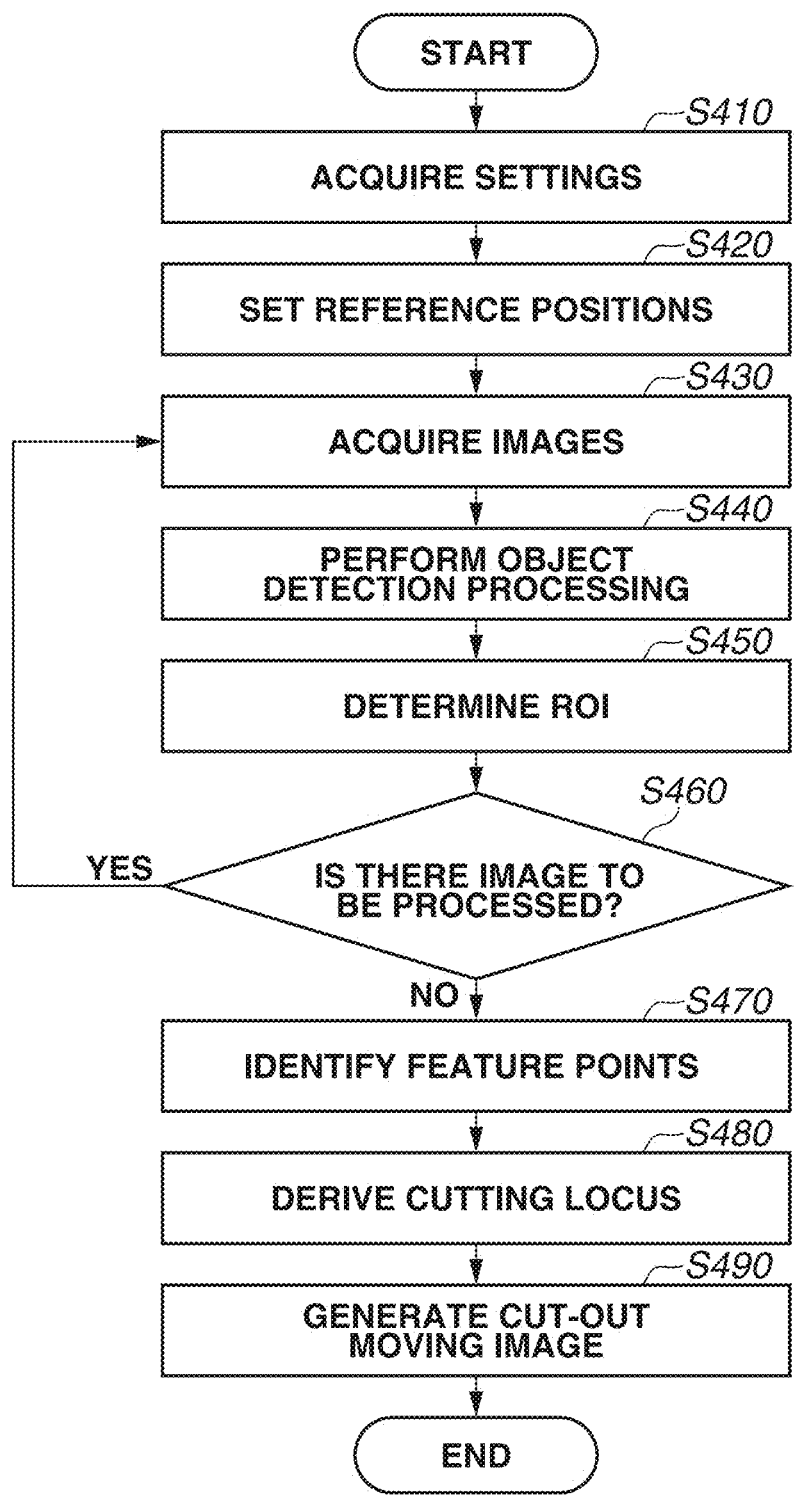
FIG. 4 is a flowchart illustrating a procedure of processing for generating a cut-out moving image.

FIG. 4 is a flowchart illustrating processing by the image processing apparatus 100 according to the present exemplary embodiment. The flowchart illustrated in FIG. 4 is implemented by, for example, the functional blocks of the image processing apparatus 100 that are illustrated in FIG. 2A and are implemented by the CPU of the image processing apparatus 100 executing a computer program stored in the ROM of the image processing apparatus 100. In the present exemplary embodiment, the processing to be described below is performed on a moving image recorded in advance (a moving image stored in the storage unit 222) as a processing target. A case where the position of the cutting-out region is changed in a pan direction (a horizontal direction) on an image will be described as an example in the present exemplary embodiment.

In step S410, the image acquisition unit 211 acquires settings relating to the moving image. For example, the image acquisition unit 211 acquires parameters relating to the moving image from the storage unit 222. The parameters relating to the moving image include image capturing direction information about the image processing apparatus 100 (the image capturing apparatus), frame rate information, and image size (image resolution) information. In the present exemplary embodiment, for example, image size information indicating 1920×1080 pixels and frame rate information indicating 30 fps are acquired as the parameters relating to the moving image.

Next, in step S420, the setting unit 214 sets reference positions. In the present exemplary embodiment, the positions of right and left basketball goals and the position of the center of the court are set as the reference positions. FIG. 5 illustrates the set reference positions. As illustrated in FIG. 5, a reference position 510 corresponding to the left side of the court, a reference position 520 corresponding to the center of the court, and a reference position 530 corresponding to the right side of the court are set. Among the reference positions 510 to 530 set for the image 30, the reference position 510 located at one end and the reference position 530 located at the other end in the pan direction (the image horizontal direction) are referred to as range reference positions. The center position of the cutting-out region 330 can be located in a range between the range reference positions, i.e., between the reference position 510 and the reference position 530 in the pan direction (the image horizontal direction). Details thereof will be described below. The reference position setting can be performed manually by the user or can be set automatically by detecting a characteristic landmark of a target sport, such as a goal ring.

Further, like the reference position 520 in FIG. 5, the center can be set by deriving the reference position 520 as a center line between the reference positions 510 and 530 after setting the reference positions 510 and 530, instead of setting the center independently.

The reference positions can be set differently for different use cases. For example, for face-to-face sports such as basketball, the reference positions are set at the center and sides of the court as illustrated in FIG. 5. Similar examples apply to volleyball and tennis. For face-to-face sports played on large grounds, such as soccer and rugby, the reference positions can be set more finely.

In step S430, the image acquisition unit 211 acquires the images included in the processing target moving image. The processing target moving image is a moving image recorded in advance and is acquired from, for example, the storage unit 222 or an external apparatus. Further, each of the acquired images is an image with a bird's-eye view of an entire sport game, such as the image 30 illustrated in FIG. 3, and a cut-out image is generated from such a bird's-eye view image. The bird's-eye view image can be an image generated by capturing an image of the entire basketball court 320 with a wide-angle camera as illustrated in the example of the basketball game in FIG. 3, an image generated by converting a video image captured with a fisheye camera, or an image generated by combining video images from a plurality of cameras. In the case of sports played on large grounds, such as soccer and rugby, it is difficult to cover an entire game within the angle of view of a single wide-angle camera, and thus a fisheye camera or a combined video image generated by combining images from a plurality of cameras is often used.

In step S440, the detection unit 212 performs the object detection processing on each of the images included in the processing target moving image and acquired in step S430, and detects the target objects therefrom. In the present exemplary embodiment, the scene of the basketball game illustrated in FIG. 3 is assumed, and the detection targets are the players 310 and a ball. Among object detection processing methods, methods based on machine learning, especially based on deep learning, are known as methods that are highly accurate and achieve a higher speed capable of real-time processing.

Specific methods thereof are You Only Look Once (YOLO) and Single Shot MultiBox Detector (SSD), and a case where SSD is used will be described now. SSD is a method for detecting each object from an image including a plurality of objects. In order to configure a classifier for detecting players and a ball using SSD, images each including a player and/or a ball are collected from a plurality of images to prepare learning data. More specifically, person regions and ball regions are extracted from the images, and a file describing coordinates of the center position of each of the extracted regions and the size thereof is generated. The learning data prepared in this manner is learned to configure a classifier for detecting human bodies and balls. An object such as a person or a ball is detected from an image using the classifier, and position information indicating the position of the region of the detected object and size information indicating the size of the region are acquired. The position information about the region of the detected object is indicated by X- and Y-coordinates of the center position of the region of the detected object, using the upper left of the image as origin coordinates. Further, the size information about the region of the detected object is indicated by the number of pixels of the width of the region and the number of pixels of the height of the region.

In step S450, the ROI determination unit 213 determines the center position of the ROI based on the result of the object detection processing in step S440. To determine the ROI, different methods can be used for different use cases. For example, the ROI determination unit 213 determines, as the center position of the ROI, a center-of-gravity position based on the positions of one or a plurality of players and a ball that are detected from the image. In this case, the center-of-gravity position can be calculated using weighted averaging where a higher weight is assigned to the players or the ball. For example, the ROI determination unit 213 can calculate the center-of-gravity position based on the positions of the one or plurality of players and the ball by using weighted averaging where a higher weight is assigned to the ball. Further, the weight can be changed based on how the game develops. More specifically, in a scene where a ball position is more important, such as a scene of a free throw in a basketball game or a scene of a goal kick in a soccer game, the weight to be assigned to the ball position in calculating the center-of-gravity position may be increased further. Alternatively, different weights can be set for different teams of players. There may be a case where a sponsor of one of the teams is to generate a cut-out video image including the players of the one of the teams at a center and a case where two patterns of cut-out moving images are generated by weighting the players of one of the teams for one pattern and weighting the players of the other team for the other pattern and then the user selects a desired cut-out moving image. Furthermore, a specific player can be weighted, and/or a specific play can be weighted.

As described above, there are various methods for determining the ROI, and the user may select a desired determination method. Further, a plurality of patterns of cut-out moving images can be generated using a respective plurality of determination methods. Further, while the ROI determination unit 213 determines a predetermined size (e.g., a size covering a half of the court) as the size of the ROI (corresponding to an enlargement ratio or the zoom ratio of a cut-out video image) in the present exemplary embodiment, the present exemplary embodiment is not limited thereto.

In step S460, the control unit 223 determines whether there is image data for which the ROI is to be determined. In a case where there is still an image for which the ROI is to be determined (YES in step S460), the processing returns to step S430 to perform the processing on the next image. In a case where there is no image for which the ROI is to be determined (NO in step S460), the processing proceeds to step S470.

In step S470, the feature point identification unit 215 extracts feature points for the cutting-out region, based on the center position of the ROI acquired for each image in step S450 and the reference positions set in step S420.

Figure 6A:
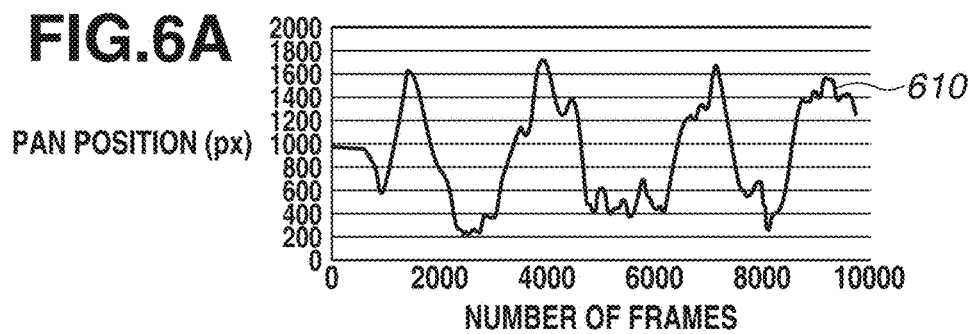
FIGS. 6A, 6B, 6C, 6D, and 6E are diagrams illustrating a cutting locus.

FIGS. 6A to 6E schematically illustrate the feature point extraction. FIG. 6A illustrates a locus 610 of the center position of the ROI in the pan direction in each image included in the processing target moving image. A horizontal axis indicates the number of frames of the images included in the processing target moving image, and ranges from 0 to 10000. Further, as illustrated in FIG. 3, each image 30 to be cut out has a size of 1920×1080 (pixels) (hereinafter referred to as px), and a range where the center position of the cutting-out region can move in the pan direction in digital panning/tilting/zooming (digital PTZ) is a range of 0 to 1920 (px) corresponding to the horizontal width of each image 30. The change in the center position of the ROI that is illustrated in FIG. 6A corresponds to a graph obtained by performing smoothing processing on a plot of the center position of the ROI acquired for each frame in step S450.

Figure 6B:
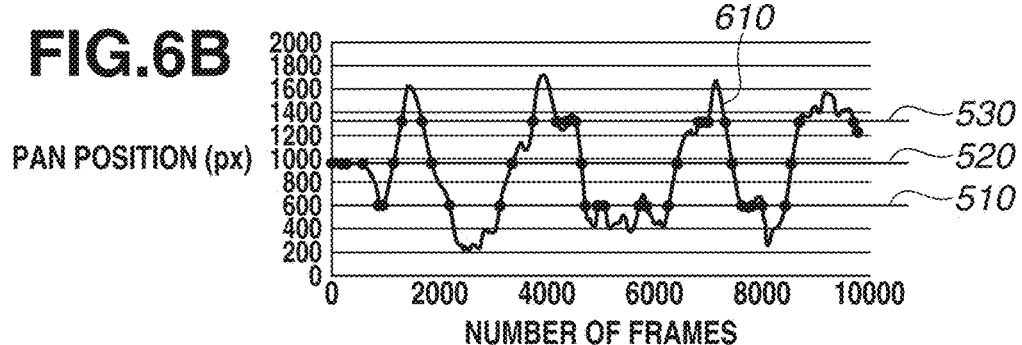

In FIG. 6B, lines corresponding to the reference positions 510 to 530 are superimposed on the locus 610 of the movement of the center position of the ROI in FIG. 6A. In FIG. 6B, the reference position 510, which is the range reference position corresponding to the left goal in the image 30, corresponds to a pan position of 600 (px) in the pan direction. Thus, in FIG. 6B, the line corresponding to the reference position 510 is superimposed on the pan position of 600 (px). Further, the reference position 520 corresponding to the center of the court in the image 30 corresponds to a pan position of 975 (px) in the pan direction.

Thus, in FIG. 6B, the line corresponding to the reference position 520 is superimposed on the pan position of 975 (px). Further, the reference position 530, which is the range reference position corresponding to the right goal in the image 30, corresponds to a pan position of 1350 (px) in the pan direction. Thus, in FIG. 6B, the line corresponding to the reference position 530 is superimposed on the pan position of 1350 (px).

FIG. 6B further illustrates how feature points are identified. The feature point identification unit 215 according to the present exemplary embodiment extracts, as feature points, intersection points where the locus 610 of the center position of the ROI in each frame image intersects with the reference positions 510 to 530. Further, the feature point identification unit 215 adds an additional feature point to each of the start position (the position where the number of frames is 0) of the locus 610 and the end position (the position where the number of frames is 10000) of the locus 610.

Figure 6C:
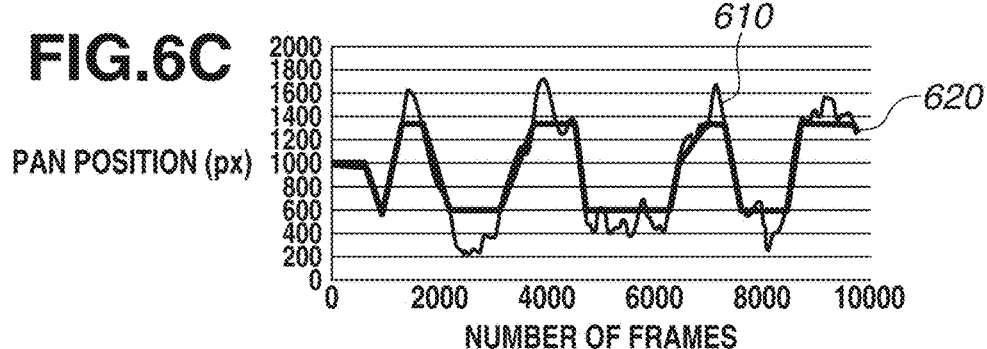

Next, in step S480, the locus derivation unit 216 derives a locus passing through the feature points identified in step S470, as a locus (a cutting locus) of the center position of the cutting-out region. A cutting locus 620 calculated in this manner is illustrated in FIG. 6C. As illustrated in FIG. 6C, the range where the center position of the cutting-out region can be located is the range between the range reference positions, i.e., between the reference position 510 and the reference position 530.

Figure 6D:
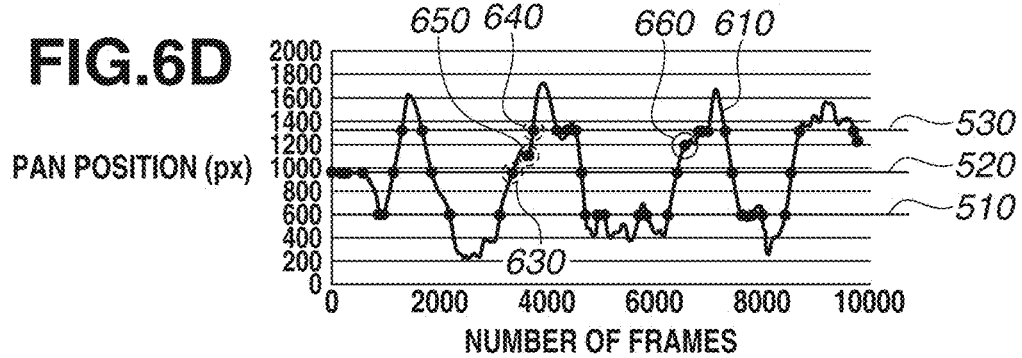

While the intersection points where the locus 610 of the center position of the ROI in each frame image intersects with the reference positions 510 to 530 are used as the feature points in deriving the cutting locus in the present exemplary embodiment, the present exemplary embodiment is not limited thereto, and an additional feature point can also be used. A method for adding an additional feature point will be described now. In this case, the feature point identification unit 215 calculates a deviation between a line connecting adjacent two feature points among the feature points which are the intersection points where the locus 610 intersects with the reference positions 510 to 530, and the locus 610 between the two feature points. More specifically, the feature point identification unit 215 derives a difference value in the pan position (px) between each position on the line connecting the two feature points and the corresponding position on the locus 610 between the two feature points and calculates, as a deviation, the maximum value among the difference values derived for the respective positions on the line. Then, the feature point identification unit 215 compares the calculated deviation between the line connecting the two feature points and the locus 610 between the two feature points and a threshold value. In a case where the deviation is greater than the threshold value, an additional feature point is added between the two feature points. A case where an additional feature point 650 is derived from adjacent feature points 630 and 640 among the feature points which are the intersection points where the locus 610 of the center position of the ROI intersects with the reference positions 510 to 530 will be described with reference to FIG. 6D. The feature point identification unit 215 calculates a difference value in the pan position (px) between each position on a line connecting the feature points 630 and 640 and the corresponding position on the locus 610 between the feature points 630 and 640. The feature point identification unit 215 calculates, as a deviation, the maximum value among the difference values in the pan position (px) that are calculated for the respective positions on the line connecting the feature points 630 and 640. Then, the feature point identification unit 215 compares the calculated deviation and a threshold value. In this case, the calculated deviation is assumed to be greater than the threshold value, and the feature point identification unit 215 adds the additional feature point 650. At this time, the additional feature point 650 is added to a position on the locus 610 that has the greatest difference value (the maximum value) among the difference values in the pan position (px) between the positions on the line connecting the feature points 630 and 640 and the corresponding positions on the locus 610 between the feature points 630 and 640. Further, another additional feature point 660 added using a similar method is illustrated in FIG. 6D. After the additional feature points 650 and 660 are added, the locus derivation unit 216 derives a locus passing through the extracted feature points (including the additional feature points 650 and 660) as a locus (a cutting locus) of the center position of the cutting-out region. A cutting locus 670 derived in this manner is illustrated in FIG. 6E.

A range of pan positions (px) to which an additional feature point can be added is limited to the range between the range reference positions, i.e., between the reference position 510 and the reference position 530. In other words, the range of pan positions (px) to which an additional feature point can be added is limited to the range from the reference position 510 at the left end in the pan direction (the horizontal direction) to the reference position 530 at the right end in the pan direction (the horizontal direction) in each image 30. In the example of FIG. 6B, an additional feature point is added to a position within the range from the pan position of 600 (px) to the pan position of 1350 (px). More specifically, no additional feature points are to be added in a range of pan positions above the pan position (px) corresponding to the reference position 530 and in a range of pan positions below the pan position (px) corresponding to the reference position 510. This limits the center position of the cutting-out region strictly within the range from the reference position 510 to the reference position 530. With such limitation, a camera work (i.e., the position of the cutting-out region) in the digital PTZ is fixed in a case where one of the teams continues to attack in the right or left part of the court as illustrated in FIG. 5.

Referring back to FIG. 4, in step S480, the locus derivation unit 216 smoothly connects the feature points acquired in step S470 and illustrated in FIG. 6D and derives a cutting locus. The cutting locus 670 derived in this manner is illustrated in FIG. 6E. At this time, as described above, the range where the center position of the cutting-out region can be located is limited to the range between the range reference positions, i.e., between the reference position 510 and the reference position 530.

Figure 6E:
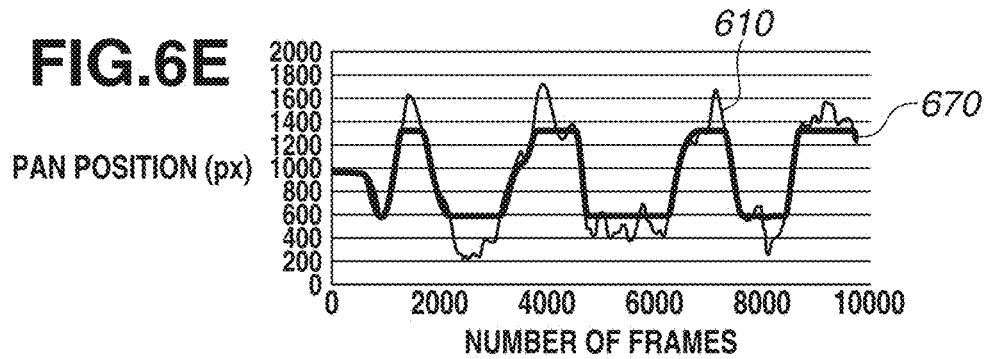

As described above, the cutting locus 620 illustrated in FIG. 6C is calculated from the feature points illustrated in FIG. 6B, and the cutting locus 670 illustrated in FIG. 6E is derived from the feature points illustrated in FIG. 6D. A method for deriving a cutting locus will now be described in more detail. While there are various possible methods for deriving a cutting locus by connecting feature points, a method that achieves smoothness and high continuity is demanded. For example, the locus derivation unit 216 derives a cutting locus from feature points using a piecewise cubic Hermite interpolation method. The piecewise cubic Hermite interpolation method is a method of dividing a domain into sub-domains and approximating each sub-domain using a polynomial of degree three or less, which enables interpolation smoothly connecting feature points without increasing the amount of calculation or memory. Thus, use of this method prevents, for example, overshoots deviating above or below the locus 610 and enables the smooth connection. Further, since no cutting loci that deviate above or below the locus 610 are to be generated, cases where the cutting-out region is located to cover the end of the court 320 in the pan direction as illustrated in the example of FIG. 3 are prevented. In other words, the cutting-out region is prevented from being located at a region not intended by the user (e.g., an end region outside the court).

In step S490, the generation unit 217 generates a cut-out image by cutting out the cutting-out region identified based on the cutting locus acquired in step S480 from each of the images of the frames included in the processing target moving image. Then, the generation unit 217 generates a cut-out moving image including the series of cut-out images respectively obtained from the images of the frames. In order to generate a cut-out image from an image, four apexes of the cutting-out region (e.g., the cutting-out region 330 illustrated in FIG. 5) in the image are to be calculated. In the present exemplary embodiment, the cutting-out region is identified so as to correspond to an image capturing region in a case where a camera installed at the same position as that of the image capturing apparatus having captured each image 30 captures an image of the center position (e.g., the pan position of 600 (px)) of the cutting-out region indicated by the cutting locus.

Figure 7A:
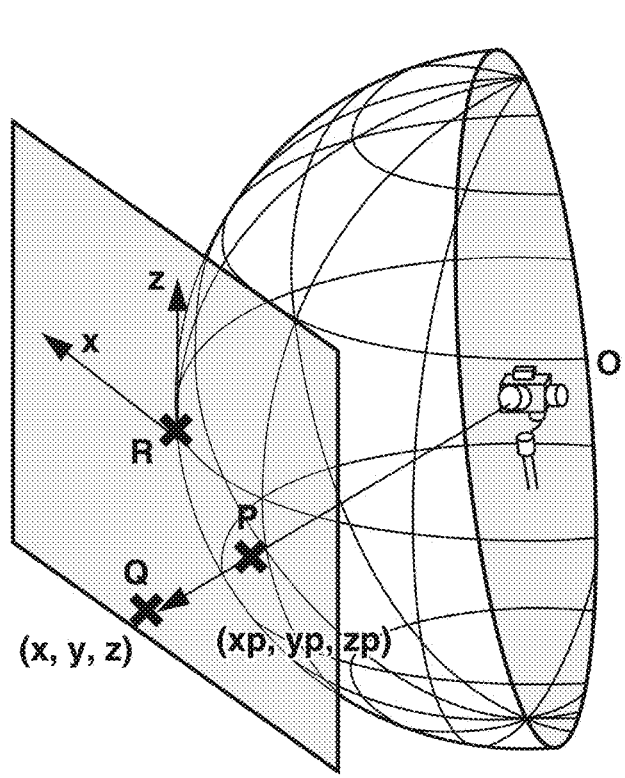
FIGS. 7A, 7B, and 7C are diagrams illustrating processing for identifying a cutting-out region.
Figure 7B:
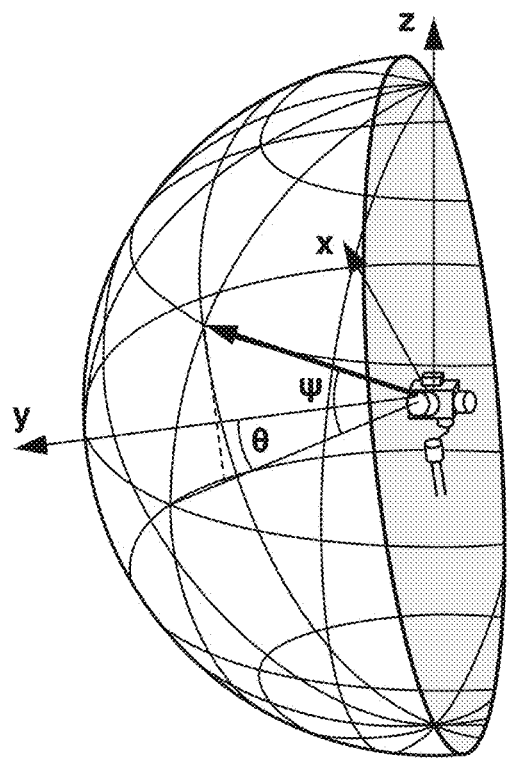
Figure 7C:
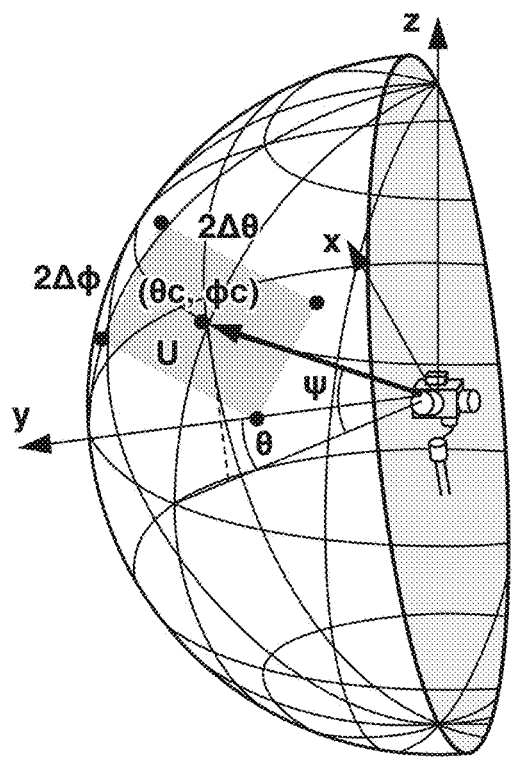

A method for calculating the four apexes of the cutting-out region from each of the images of the frames included in the processing target moving image will be described with reference to FIGS. 7A to 7C. FIG. 7A illustrates a relationship between each image (each image 30) included in the processing target moving image captured by the image capturing apparatus, and spherical coordinates where a position O of the image capturing apparatus is an origin point. In the present exemplary embodiment, the position O of the image capturing apparatus that captures moving images and the imaging range thereof are fixed, and there is no change in the positional relationship between the spherical coordinates illustrated in FIG. 7A and each of the images included in the moving image. Further, as illustrated in FIG. 7A, the center position of each of the images included in the moving image is indicated by the letter R, and x- and z-axes respectively indicate a horizon direction of the image and a vertical direction of the image. Further, FIG. 7B defines the spherical coordinates (r, θ, φ).

The generation unit 217 identifies where the current processing target image is in the images of the frames included in the processing target moving image. For example, the processing target image is identified as the image of the four-thousandth frame. The generation unit 217 identifies the center position of the cutting-out region in the four-thousandth frame based on the derived cutting locus. In the case of the example of the cutting locus 670 illustrated in FIG. 6E, the generation unit 217 identifies 1350 (px) as the center position of the cutting-out region in the processing target image. Then, the generation unit 217 performs image transformation to transform the identified center position of the cutting-out region in the image in FIG. 7A into a point U (θc, φc) on the spherical coordinates. The point U at this time is illustrated in FIG. 7C. Using the point U as the center, the generation unit 217 obtains the positions of the four apexes (F1, F2, F3, F4) on the spherical coordinates as specified by the following formula (1), with a horizontal angle of view of 2Δθ and a vertical angle of view of 2Δφ corresponding to the size of the cutting-out region.

$$\begin{pmatrix} F1 \\ F2 \\ F3 \\ F4 \end{pmatrix} = \begin{pmatrix} (\theta c - \Delta\theta, \ \varphi c + \Delta\varphi) \\ (\theta c - \Delta\theta, \ \varphi c - \Delta\varphi) \\ (\theta c + \Delta\theta, \ \varphi c - \Delta\varphi) \\ (\theta c + \Delta\theta, \ \varphi c + \Delta\varphi) \end{pmatrix} \quad (1)$$

Then, the generation unit 217 acquires the four apexes of the cutting-out region by transforming the positions of the four apexes of the cutting-out region on the spherical coordinates to the coordinates on the processing target image illustrated in FIG. 7A again. The cutting-out region 330 in FIG. 3 is an example of the cutting-out region identified by the foregoing processing. Then, the generation unit 217 generates a cut-out image by cutting out the cutting-out region identified on the processing target image and performing distortion correction processing, such as projective transformation, on the cut-out region. The above-described processing is performed on each of the images of the frames in the processing target moving image, and a cut-out image is generated from each of the images.

Then, the cut-out moving image including the series of cut-out images generated in step S490 is transmitted to an external apparatus by the output unit 218.

While the case where the center position of the cutting-out region is changed on the pan direction (the image horizontal direction) in the image has been described above, the present exemplary embodiment is not limited thereto, and the cutting-out region can be changed on a tilt direction (an image vertical direction) in the image. In this case, the image processing apparatus 100 derives a locus of the position of the ROI in the tilt direction in each of the plurality of images included in the processing target moving image. Then, as described above with reference to FIGS. 6A to 6E, the image processing apparatus 100 identifies feature points based on preset reference positions and the locus of the position of the ROI in the tilt direction, and derives a cutting locus connecting the feature points. Thereafter, the image processing apparatus 100 generates a series of cut-out images from the processing target moving image using the cutting locus.

As described above, the image processing apparatus 100 according to the present exemplary embodiment determines the position of the ROI for each of a plurality of images included in a moving image and identifies feature points based on a locus of movement of the position of the ROI and reference positions. Then, the image processing apparatus 100 derives a cutting locus based on the identified feature points and generates a cut-out image from the cutting-out region identified based on the cutting locus in each of the plurality of images included in the moving image. Further, the image processing apparatus 100 acquires a cut-out moving image including the series of cut-out images respectively acquired from the plurality of images included in the moving image.

By performing the foregoing processing, for example, a cut-out moving image that is unblurred despite a slight motion of a player or a dribble and follows a player or a ball without delay when the offense and defense switch is generated. Further, the range of possible positions of the cutting-out region is limited using reference positions, and this prevents a region not intended by the user from being determined as the cutting-out region.

Next, a second exemplary embodiment will be described. Redundant descriptions of parts similar to those in the first exemplary embodiment will be omitted. In the above-described method according to the first exemplary embodiment, a cutting locus suitable for a relatively long moving image is derived to generate a cut-out moving image. In the present exemplary embodiment, a case where the processing for deriving a cutting locus in steps S470 and S480 is divided by a time and performed will be described.

Figure 8:
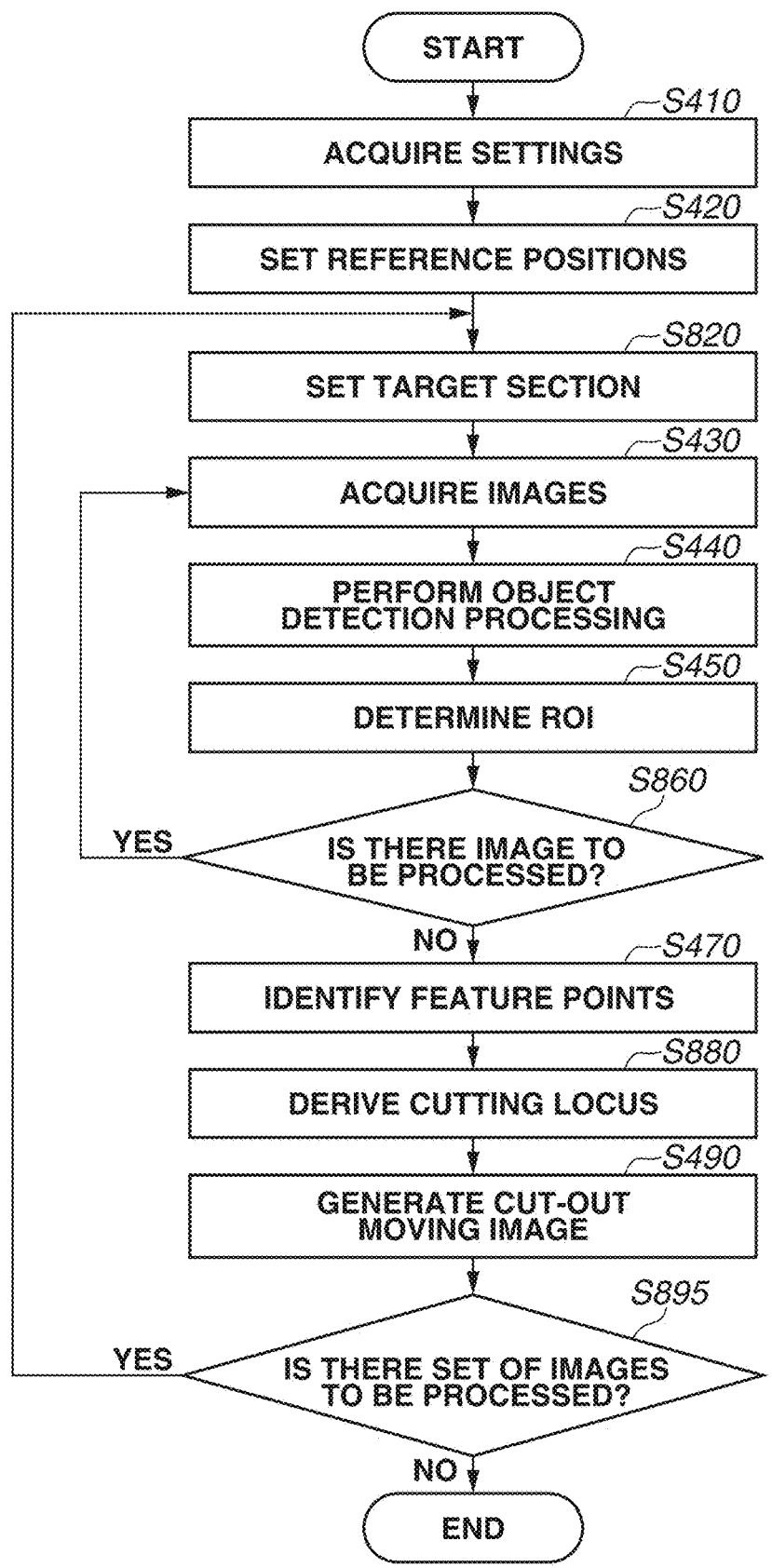
FIG. 8 is a flowchart illustrating another processing for generating the cut-out moving image.

Processing by the image processing apparatus 100 according to the present exemplary embodiment will be described with reference to a flowchart illustrated in FIG. 8. The flowchart illustrated in FIG. 8 is performed by, for example, the functional blocks of the image processing apparatus 100 that are illustrated in FIG. 2A and are implemented by the CPU of the image processing apparatus 100 executing a computer program stored in the ROM of the image processing apparatus 100. Steps other than steps S820, S860, S880, and S895 in the flowchart are similar to those according to the first exemplary embodiment described above with reference to FIG. 4, and thus redundant descriptions thereof will be omitted.

In step S820, the setting unit 214 sets a target section (the number of seconds of a video image to be analyzed) corresponding to a range of the number of image frames to be analyzed for generating a cut-out moving image. The longer the target section, the more the entire flow is considered, so that a smooth camera work is achieved in the digital PTZ. However, this delays the generating of a cut-out moving image by the time length, and it takes time for the user to view a video image. For example, in basketball, there are a 24-second rule (which states that, during an offense, an attempt to take a shot has to be made within 24 seconds) and a 14-second rule (which states that, in the case of an offensive rebound, an attempt to take the next shot has to be made within 14 seconds). These rules are intended to encourage fast-paced games. Considering the rules, players are less likely to stay at one side of the court for one minute or longer. Thus, the target section is set to one minute corresponding to 1800 frames at 30 fps. At this time, the target section can be changed depending on the situation. While a case where the target section is constant is described below, the target section may be decreased in a case where the game develops speedily.

In step S860, the control unit 223 determines whether there is still an image frame for which the ROI is to be determined. In a case where the ROI determination is not completed for 1800 frames based on the target section set in step S820 (YES in step S860), the processing returns to step S430 to perform the processing on the next image frame. In a case where the ROI determination is completed for 1800 frames (NO in step S860), the processing proceeds to step S470.

In step S880, the locus derivation unit 216 derives a cutting locus using the feature points that are identified from the moving image of the current processing target section in step S470. The present exemplary embodiment is not limited thereto, and the locus derivation unit 216 can derive a cutting locus for the moving image of the current processing target section also using the feature points identified in the moving image of a previous target section immediately before the current processing target section. More specifically, the locus derivation unit 216 can derive a cutting locus based on the feature points identified based on the locus of the position of the ROI in 1800 frames corresponding to the current target section and the feature points close to the end of the previous target section (e.g., frames up to the fiftieth frame from the frame at the end). As described above, by adding the feature points identified in the moving image of the previous target section, a cut-out moving image that maintains continuity of cutting-out region positions even at boundaries of target sections is generated.

In step S895, the control unit 223 determines whether there is data from which a cut-out image is to be generated. In a case where there is still a moving image including unprocessed frame images and the cut-out processing on the next target section is to be performed (YES in step S895), the processing returns to step S820 to set the next target section. In a case where there is no moving image including unprocessed frame images and the cut-out processing on the next target section is not to be performed (NO in step S895), the processing illustrated in FIG. 8 ends.

As described above, the image processing apparatus 100 according to the present exemplary embodiment divides an acquired moving image by a target section and continually generates cut-out moving images, whereby cut-out moving images are generated in a state close to real time.

Further, the exemplary embodiments of the present disclosure can be implemented by the following processing. A program for implementing one or more functions according to the above-described exemplary embodiments is read and executed by one or more processors. The program can be supplied to a system or an apparatus including the one or more processors via a network or a storage medium.

Further, the exemplary embodiments of the present disclosure can be implemented by a circuit (e.g., an ASIC) for implementing one or more functions according to the above-described exemplary embodiments.

Further, the present disclosure is not limited to the exemplary embodiments described above, and various changes can be made within the spirit of the present disclosure. For example, combinations of the exemplary embodiments are also encompassed within the disclosure of the present specification.

According to the above-described exemplary embodiments, in a case where cut-out images are generated from cutting-out regions in a plurality of images included in a moving image, the cutting-out regions can be determined more appropriately.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-012430, filed Jan. 28, 2022, which is hereby incorporated by reference herein in its entirety.

What is claimed is:

1. An image processing apparatus comprising:
one or more memories storing instructions; and
one or more processors that, upon execution of the stored instructions, configures the image processing apparatus to:
acquire a moving image;
detect an object from each of a plurality of images included in the moving image;
determine a position of a region of interest in each of the plurality of images included in the moving image, based on a result of the detection;
identify a feature point where a point included in a locus corresponding to movement of the position of the region of interest coincides with a reference position for a cutting-out region;
derive, based on the identified feature point, a cutting locus for the moving image, which is a locus corresponding to movement of a position of the cutting-out region; and
generate, in each of the plurality of images included in the moving image, a cut-out image corresponding to the cutting-out region identified based on the derived cutting locus.

2. The image processing apparatus according to claim 1, wherein execution of the instructions further configures the image processing apparatus to
identify an additional feature point using the feature point, and
derive the cutting locus based on the feature point and the additional feature point.

3. The image processing apparatus according to claim 1, wherein the reference position is set based on a user's operation.

4. The image processing apparatus according to claim 1, wherein the reference position is set based on a position of a specific object detected from each of the plurality of images.

5. The image processing apparatus according to claim 1, wherein the moving image is a moving image recorded in advance.

6. An image processing method comprising:
acquiring a moving image;
detecting an object from each of a plurality of images included in the moving image;
determining a position of a region of interest in each of the plurality of images included in the moving image, based on a result of the detecting;
identify a feature point where a point included in a locus corresponding to movement of the position of the region of interest coincides with a reference position for a cutting-out region;
deriving, based on the identified feature point, a cutting locus for the moving image, which is a locus corresponding to movement of a position of the cutting-out region; and
generating, in each of the plurality of images included in the moving image, a cut-out image corresponding to the cutting-out region identified based on the derived cutting locus.

7. A non-transitory computer readable storage medium storing a computer-executable instructions that, when executed by one or more processors, configures an image processing apparatus to perform an image processing method, the method comprising:
acquiring a moving image to be processed;
detecting an object from each of a plurality of images included in the moving image;
determining a position of a region of interest in each of the plurality of images included in the moving image, based on a result of the detecting;
identify a feature point where a point included in a locus corresponding to movement of the position of the region of interest coincides with a reference position for a cutting-out region;
deriving, based on the identified feature point, a cutting locus for the moving image, which is a locus corresponding to movement of a position of the cutting-out region; and
generating, in each of the plurality of images included in the moving image, a cut-out image corresponding to the cutting-out region identified based on the derived cutting locus.

8. The image processing apparatus according to claim 1, wherein the reference position is a position where a center of the cutting-out region is able to be located.

9. The image processing apparatus according to claim 1, wherein the position of the cutting-out region coincides with the identified feature point.

10. The image processing apparatus according to claim 1, wherein the cutting locus is a locus passing through the identified feature point.

11. The image processing apparatus according to claim 1, wherein
a plurality of feature points where a plurality of points included in a locus corresponding to the movement of the position of the region of interest coincides with a plurality of reference positions for cutting-out regions are identified; and
the cutting locus is derived so that the movement of the position of the cutting-out region passes through the identified plurality of feature points.

* * * * *